(12) United States Patent

Nuhn

(10) Patent No.: US 12,660,737 B2

(45) Date of Patent: Jun. 23, 2026

(54) LIQUID MANURE PUMP WITH ANGLED GEARBOX

(71) Applicant: Nuhn Industries Ltd., Sebringville (CA)

(72) Inventor: Ian Nuhn, Stratford (CA)

( * ) Notice: Subject to any disclaimer, the term of this patent is extended or adjusted under 35 U.S.C. 154(b) by 861 days.

(21) Appl. No.: 17/955,716

(22) Filed: Sep. 29, 2022

(65) Prior Publication Data

US 2023/0114168 A1 Apr. 13, 2023

Related U.S. Application Data

(60) Provisional application No. 63/253,706, filed on Oct. 8, 2021.

(51) Int. Cl.
| | | |
|---|---|---|
| *A01C 3/02* | (2006.01) | |
| *A01C 19/00* | (2006.01) | |
| *A01C 23/00* | (2006.01) | |
| *A01C 23/04* | (2006.01) | |

(52) U.S. Cl.
CPC .............. *A01C 3/026* (2013.01); *A01C 19/00* (2013.01); *A01C 23/002* (2013.01); *A01C 23/003* (2013.01); *A01C 23/005* (2013.01); *A01C 23/04* (2013.01)

(58) Field of Classification Search
CPC combination set(s) only.
See application file for complete search history.

(56) References Cited

U.S. PATENT DOCUMENTS

| | | | |
|---|---|---|---|
| 2,792,158 A | 5/1957 | Veitch et al. | |
| 2,890,659 A | 6/1959 | Otto et al. | |
| 3,367,583 A | 2/1968 | Kellogg | |
| 3,417,929 A | 12/1968 | Secrest | |
| 3,557,981 A | 1/1971 | Seymour | |
| 3,610,416 A | 10/1971 | Otto | |
| 3,824,042 A | 7/1974 | Barnes et al. | |
| 3,905,725 A | 9/1975 | Johnson | |
| 3,915,594 A * | 10/1975 | Nesseth ..................... | F04D 7/04 |
| | | | 415/213.1 |
| 3,948,450 A * | 4/1976 | Erlitz ..................... | B01F 33/502 |
| | | | 241/97 |
| 4,145,008 A | 3/1979 | Wolford | |

(Continued)

FOREIGN PATENT DOCUMENTS

| | | |
|---|---|---|
| DE | 2818501 A1 | 8/1979 |
| DE | 8218017 U1 | 10/1986 |

(Continued)

OTHER PUBLICATIONS

Power-take-off pumps. Huning Brand Gulletechnik. http://www.brnad-melle.de/31-1-Power-take-off+pumps.html.

*Primary Examiner* — Binh Q Tran

(74) *Attorney, Agent, or Firm* — Brunet & Co. Ltd.; Robert Brunet; Hans Koenig

(57) ABSTRACT

A gearbox particularly useful for liquid manure pumps has a power input shaft that is coupled through a gearset to an impeller of the pump. The rotation axis of the impeller is angled in a range of 55-75° with respect to the rotation axis of the power input shaft. Such an arrangement provides both the necessary power and the correct pump orientation for a trailer-mounted pump to efficiently and effectively pump liquid manure from the bottom of a liquid manure lagoon having long sloped sides.

19 Claims, 8 Drawing Sheets

(56)                     References Cited

U.S. PATENT DOCUMENTS

| | | | |
|---|---|---|---|
| 4,214,879 A | | 7/1980 | Whetstone et al. |
| 4,406,413 A | * | 9/1983 | Houle .................... A01C 3/026 |
| | | | 241/46.11 |
| 4,555,063 A | | 11/1985 | Goettsch |
| 4,594,006 A | | 6/1986 | Depeault |
| 4,616,979 A | | 10/1986 | Hynes et al. |
| 4,830,585 A | | 5/1989 | Ruyle |
| 4,836,687 A | | 6/1989 | Kardoes et al. |
| 4,971,526 A | | 11/1990 | Ruyle |
| 5,100,303 A | | 3/1992 | Depault |
| 5,624,241 A | | 4/1997 | Nesseth |
| 6,520,750 B2 | | 2/2003 | Eller et al. |
| 2012/0224982 A1 | * | 9/2012 | Nuhn ................... F04D 29/466 |
| | | | 417/430 |
| 2012/0257988 A1 | * | 10/2012 | Depault ................ F04B 41/06 |
| | | | 417/62 |
| 2017/0016448 A1 | * | 1/2017 | Younker ................ F16H 55/56 |
| 2017/0198722 A1 | * | 7/2017 | Nuhn .................... A01C 3/026 |
| 2020/0344945 A1 | * | 11/2020 | Bambauer ............. B62D 63/08 |

FOREIGN PATENT DOCUMENTS

| | | | |
|---|---|---|---|
| EP | 730094 | B1 | 4/2000 |
| EP | 1782882 | A1 | 5/2007 |
| GB | 2049384 | A | 12/1980 |
| GB | 2110101 | A | 6/1983 |
| GB | 2349101 | A | 10/2000 |

* cited by examiner

LIQUID MANURE PUMP WITH ANGLED GEARBOX

CROSS-REFERENCE TO RELATED APPLICATIONS

This application claims the benefit of United States Provisional patent application U.S. Ser. No. 63/253,706 filed Oct. 8, 2021, the entire contents of which is herein incorporated by reference.

FIELD

This application relates to liquid manure pumps.

BACKGROUND

Liquid manure comprises a suspension of solid manure in a liquid medium (i.e., water). Liquid manure is often stored in a large lagoon for use later for fertilizing fields. When use of the stored liquid manure is desired, a pump immersed in the liquid manure lagoon is used to pump the liquid manure out of the lagoon into a tank of a liquid manure spreader. A standard liquid manure pump is described in U.S. Pat. No. 8,944,758 issued Feb. 3, 2015, the entire contents of which is herein incorporated by reference.

Many liquid manure lagoons have long sloped walls descending gradually to a bottom of the lagoon. Long sloped walls create a number of difficulties. Lagoon-mounted pumps would need to be mounted on a supporting structure near the center of the lagoon in order to maximize emptying of the lagoon rather than at the wall of the lagoon where the lagoon is much shallower. A pump mounted near the center of the lagoon would be more difficult to access for servicing. Boom-mounted pumps would require a much longer boom, thereby increasing the cost and complexity of the support apparatus for the pump. For trailer-mounted pumps, the impeller housing of a standard pump would be incorrectly oriented in the lagoon to maximize lagoon clearance because the trailer would be situated on the sloped wall of the lagoon and the impeller would therefore be on an angle relative to the vertical thereby being unable to efficiently remove liquid manure from the bottom of the lagoon. In all of these arrangements, longer liquid manure delivery conduits are required, which requires a higher-pressure pump in order to effectively and efficiently pump liquid manure from the lagoon.

There remains a need for a liquid manure pumping apparatus that is particularly useful for liquid manure lagoons having long sloped walls, but can preferably be readily adapted for other purposed.

SUMMARY

A liquid manure pump comprises: a pump body having an elongated liquid conduit; an impeller located proximate a bottom end of the pump body, the impeller having an impeller rotation axis about which the impeller rotates, the impeller having vanes shaped to direct liquid manure into the liquid conduit; a gearbox containing a gearset; a power input shaft having a power input shaft rotation axis about which the power input shaft rotates, the power input shaft operatively connectable at a proximal end thereof to a power source, the power input shaft operatively connected to the impeller through the gearset for rotationally driving the impeller; and, the impeller rotation axis forming an acute angle in a range of 55-75° with the power input shaft rotation axis when the impeller rotation axis and the power input shaft rotation axis are projected into the same plane.

A liquid manure pump comprises: a pump body having an elongated liquid conduit; an impeller located proximate a bottom end of the pump body, the impeller having an impeller rotation axis about which the impeller rotates, the impeller having vanes shaped to direct liquid manure into the liquid conduit; a gearbox containing a first gearset and a second gearset; a power input shaft having a power input shaft rotation axis about which the power input shaft rotates, the power input shaft operatively connectable at a proximal end thereof to a power source; a first power output shaft having a first power output shaft rotation axis, the first power output shaft operatively connected to the impeller, the first power output shaft operatively connected to the power input shaft through the first gearset for rotationally driving the first power output shaft for rotationally driving the impeller; and, a second power output shaft having a second power output shaft rotation axis about which the second power output shaft rotates, the second power output shaft operatively connected to the power input shaft through the second gearset for rotationally driving the second power output shaft, the impeller rotation axis forming an acute angle in a range of 55-75° with the power input shaft rotation axis when the impeller rotation axis and the power input shaft rotation axis are projected into the same plane.

A gearbox particularly useful for a liquid manure pump comprises: an enclosure; a first gearset situated in the enclosure; a power input shaft having a power input shaft rotation axis about which the power input shaft rotates, the power input shaft operatively connectable at a proximal end thereof to a power source, the power input shaft connected to the first gearset for rotationally driving the first gearset; a first power output shaft having a first power output shaft rotation axis about which the first power output shaft rotates, the first power output shaft directly connected to the first gearset to be rotationally driven by the first gearset when the first gearset is driven by the power input shaft; a second gearset situated in the enclosure; and, a second power output shaft having a second power output shaft rotation axis about which the second power output shaft rotates, the first power output shaft rotation axis forming an acute angle in a range of 55-75° with the power input shaft rotation axis when the first power output shaft rotation axis and the first power input rotation axis are projected into the same plane.

The acute angle is preferably in a range of 65-70°, for example 67.5°. Angles in this range are particularly good for ensuring proper orientation of the impeller in the lagoon to provide complete removal of liquid manure from the liquid manure lagoon.

In some embodiments, the pump comprises a power output shaft directly connected to the gearset so that the power input shaft rotationally drives the power output shaft and directly connected to the impeller so that the power output shaft rotationally drives the impeller.

In some embodiments, the pump comprises a power output shaft directly connected to the gearset so that the power input shaft rotationally drives the power output shaft, and the impeller comprises an impeller shaft connected to the power output shaft so that the power output shaft rotationally drives the impeller shaft which rotationally drives the impeller.

In some embodiments, the second power output shaft rotation axis is perpendicular to the power input shaft rotation axis when the second power output shaft rotation axis and the power input shaft rotation axis are projected into the same plane.

In some embodiments, the first gearset is geared so that the impeller rotates faster than the first output shaft.

In some embodiments, the first gearset is geared so that the first power output shaft rotates slower than the power input shaft. In such embodiments, a propeller may be mounted on the first power output shaft.

In some embodiments, the pump further comprises a propeller and the power input shaft is operatively connected at a distal end thereof to the propeller for rotationally driving the propeller.

In some embodiments, the pump further comprises a propeller and the power input shaft is operatively connected to a third power output shaft, and the third power output shaft is connected to the propeller for rotationally driving the propeller.

In some embodiments, the power input shaft is operatively connected to the third power output shaft through a third gearset, and the third gearset is geared so that the propeller rotates slower than the power input shaft In some embodiments, all of the shafts are rotationally supported on respective bearings, the bearings for each shaft housed in respective bearing units. In some embodiments, each of the bearing units is sealingly isolated from the gearbox so that each of the bearing units can contain a separate reservoir of lubricating oil from the other bearing units and from the gearbox. In some embodiments, the one or more of the bearing units are removably mounted on the gearbox.

In some embodiments, the gearbox contains cooling oil that is circulated by a cooling oil pump through an oil cooler.

In some embodiments, the power source comprises a power-take-off (PTO) connected to a combustion engine.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

In the present invention, a gearbox is provided that is particularly useful for liquid manure pumps. The gearbox has a power input shaft that is coupled through a gearset to an impeller of the pump. The rotation axis of the impeller is angled in a range of 55-75° with respect to the rotation axis of the power input shaft. Such an arrangement provides both the necessary power and the correct pump orientation for a trailer-mounted pump to efficiently and effectively pump liquid manure from the bottom of a liquid manure lagoon having long sloped sides.

Figures 1, 2:
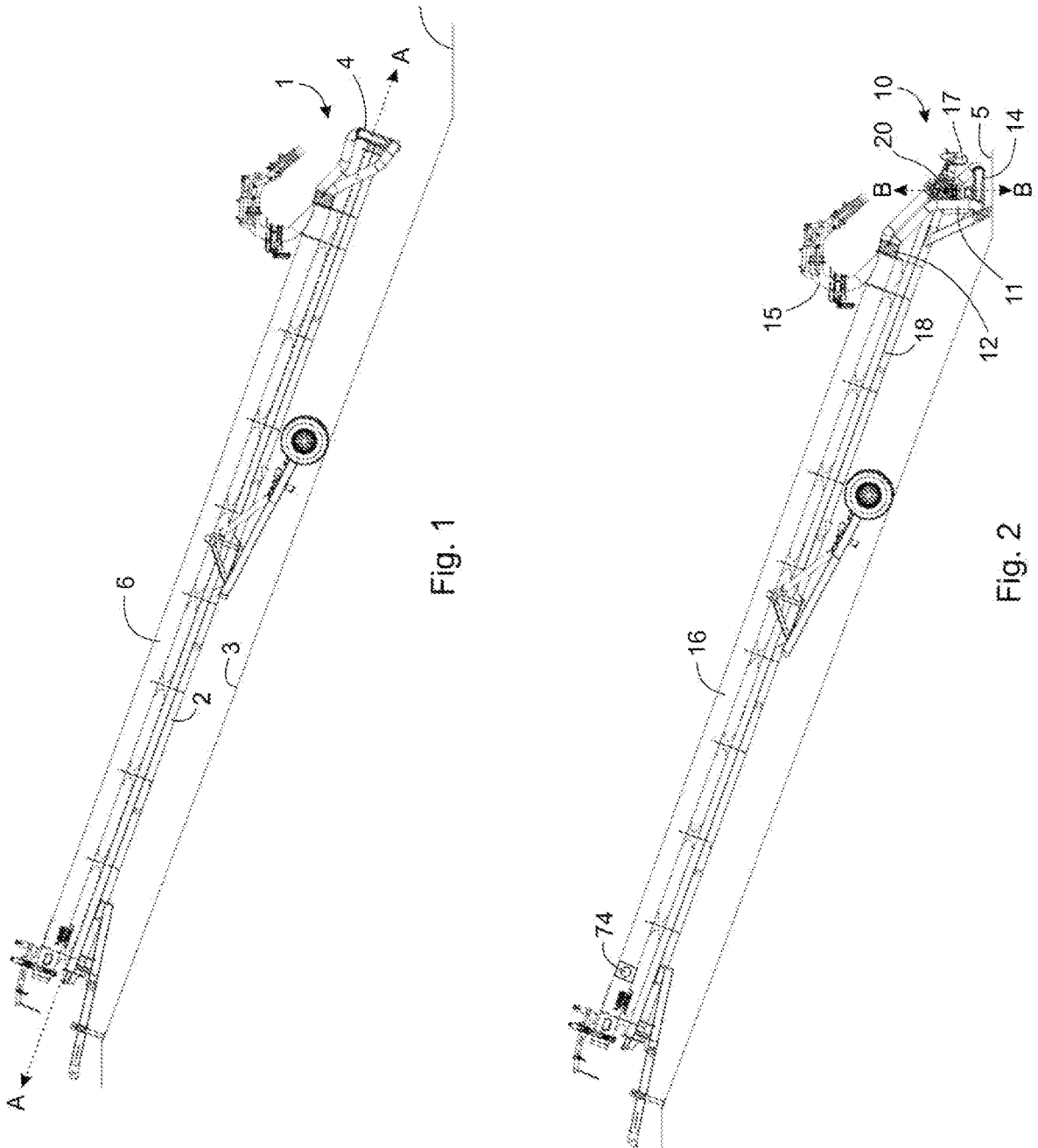
FIG. 1 depicts side view of a trailer on a sloped wall of a liquid manure lagoon, the trailer having supported thereon a standard liquid manure pump of the prior art.
FIG. 2 depicts side view of a trailer on a sloped wall of a liquid manure lagoon, the trailer having supported thereon a high-pressure liquid manure pump of the present invention.
Figure 3:
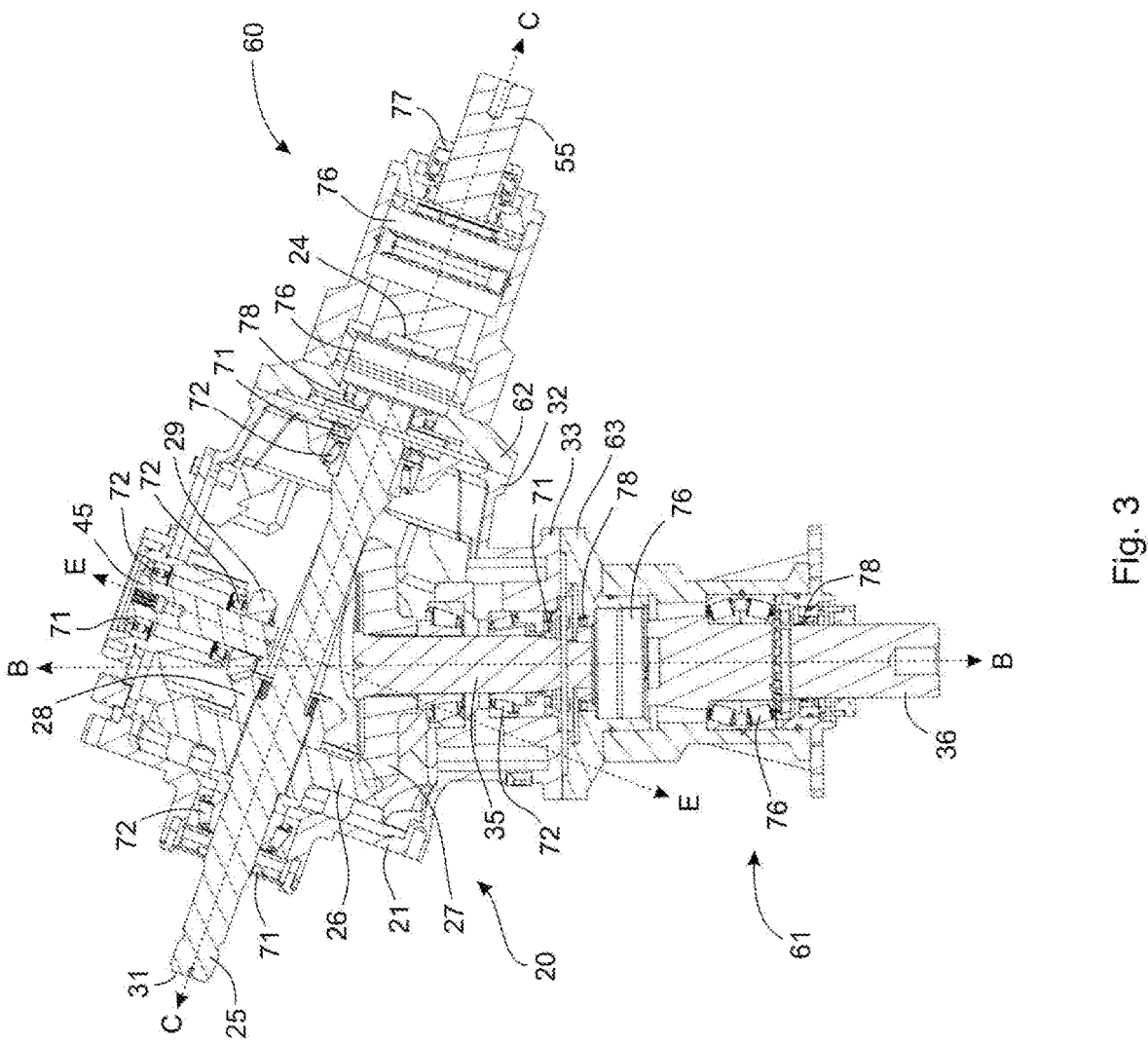
FIG. 3 depicts a cross-section of a gearbox and mechanical bearing units of the liquid manure pump depicted in FIG. 2.
Figure 4:
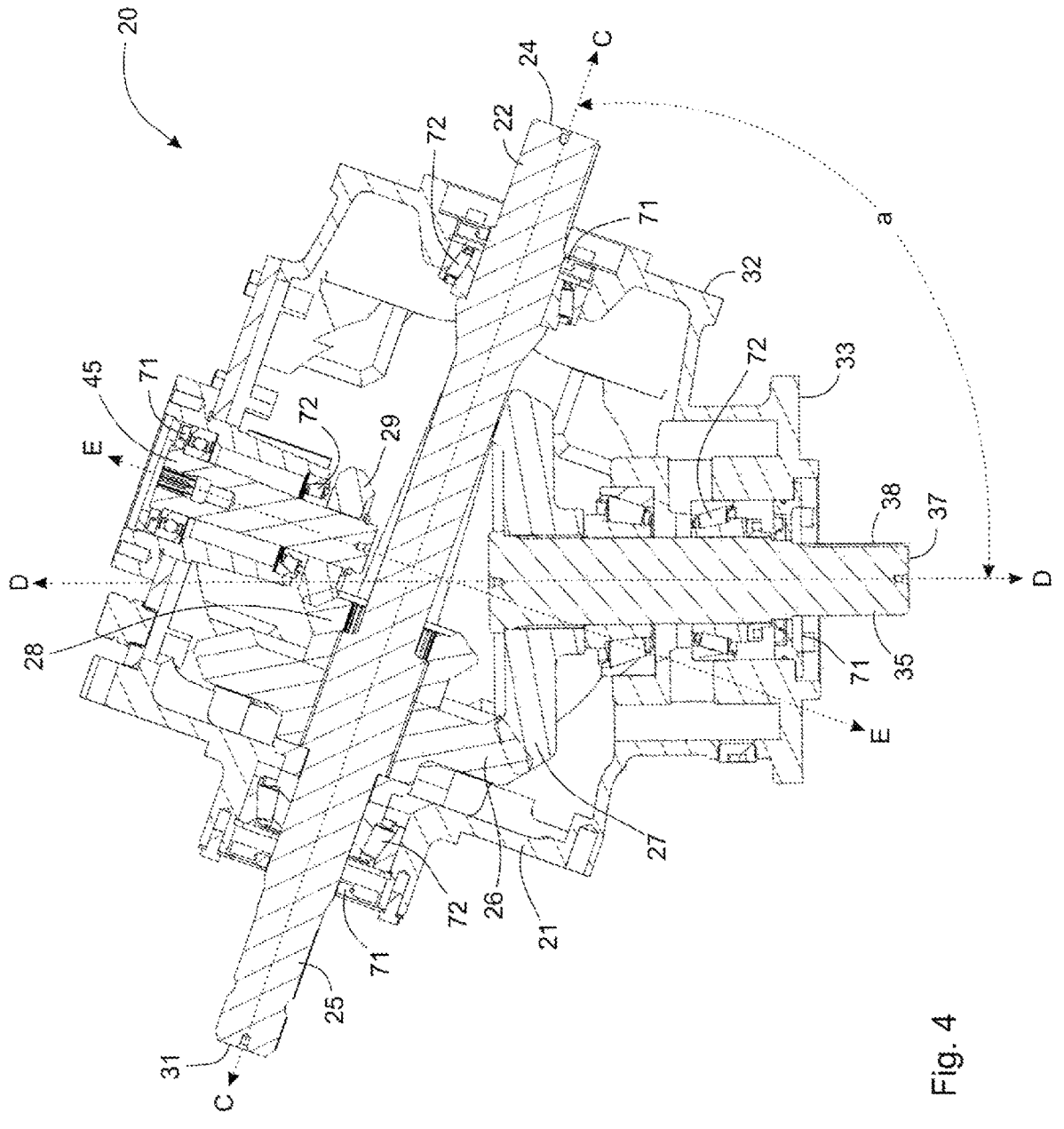
FIG. 4 depicts the gearbox shown in FIG. 3 without the mechanical bearing units.
Figure 5:
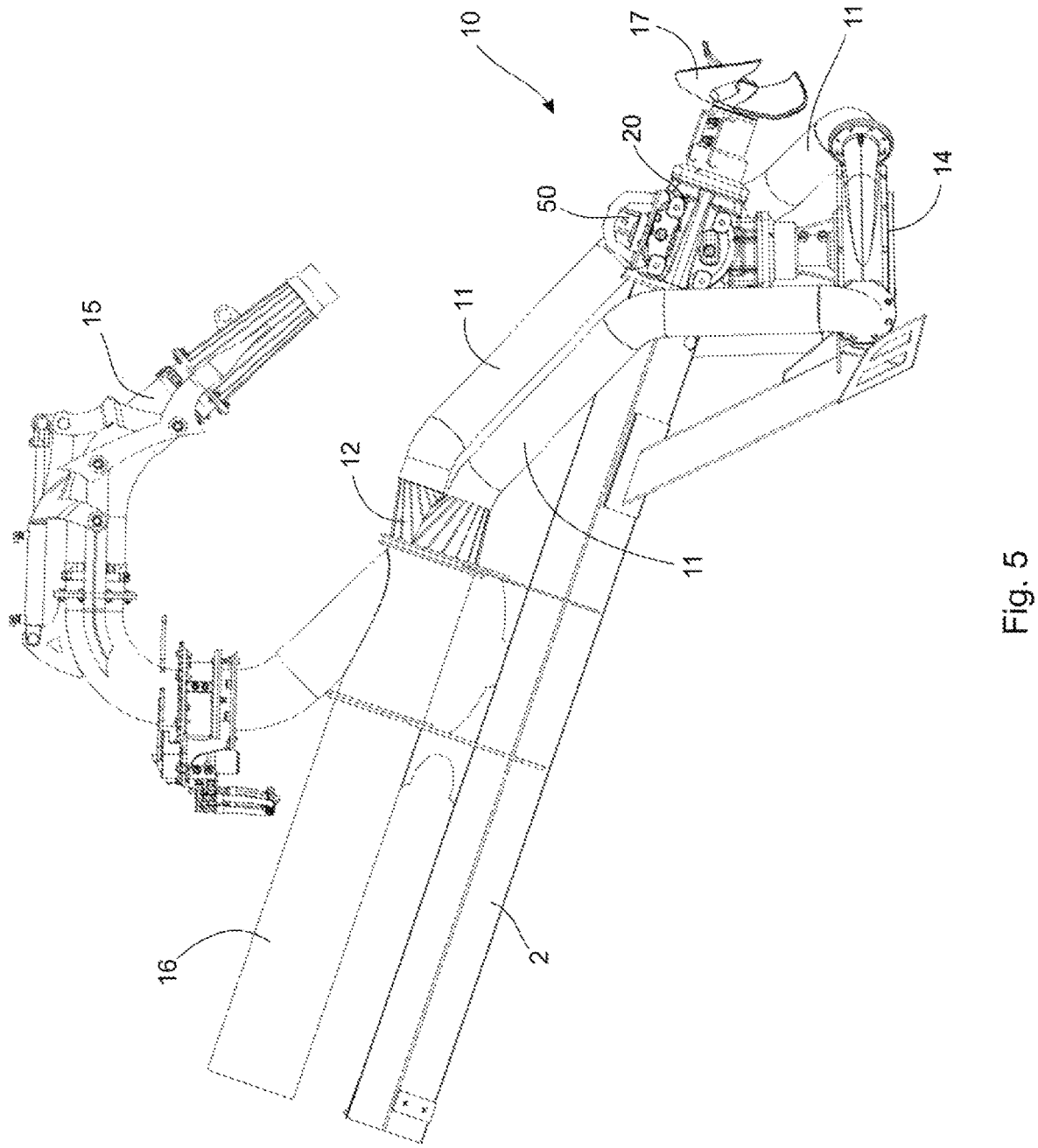
FIG. 5 depicts a magnified view of a distal end of the liquid manure pump of FIG. 2.
Figure 6:
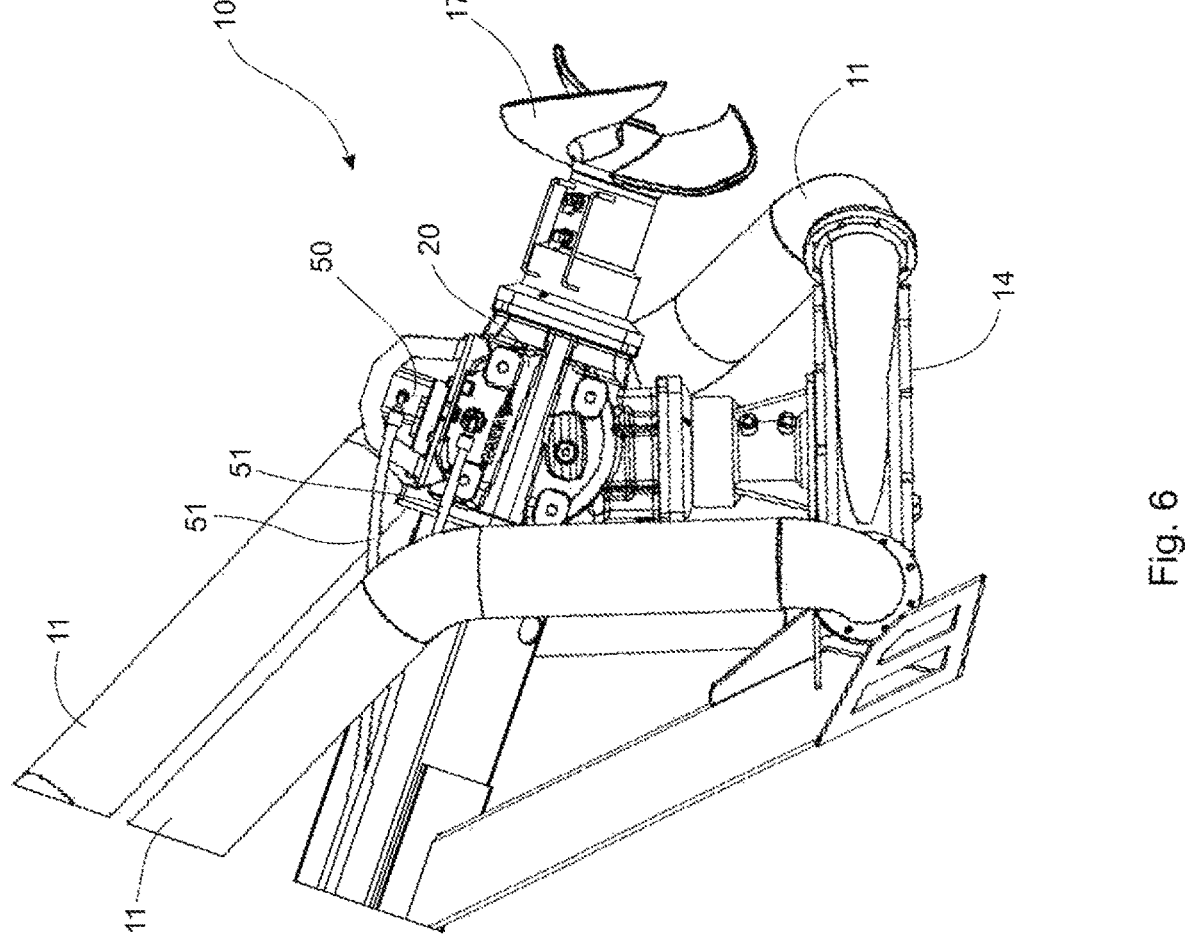
FIG. 6 depicts a more detailed view of FIG. 5.

With reference to FIG. 1, a standard liquid manure pump 1 of the prior art as described in U.S. Pat. No. 8,944,758 is shown mounted on a trailer 2 parked on a long, sloped wall 3 of a liquid manure lagoon so that an impeller housing 4 of the pump 1 is proximate a bottom 5 of the liquid manure lagoon. It is evident from FIG. 1 that an axis of rotation A-A of the impeller is angled with respect to the bottom 5 of the lagoon, and it is very difficult, if not impossible, to orient the axis of rotation A-A of the impeller vertically so as to orient the impeller housing 4 horizontally in order to permit the impeller housing 4 to sit flush with the bottom 5 of the lagoon to allow complete clearing of the lagoon. Further, to reach the bottom 5 of the lagoon, a liquid conduit 6 of the pump must be extended to great length, thereby challenging the ability of the standard pump 1 to efficiently pump the liquid manure from the lagoon.

Figure 7:
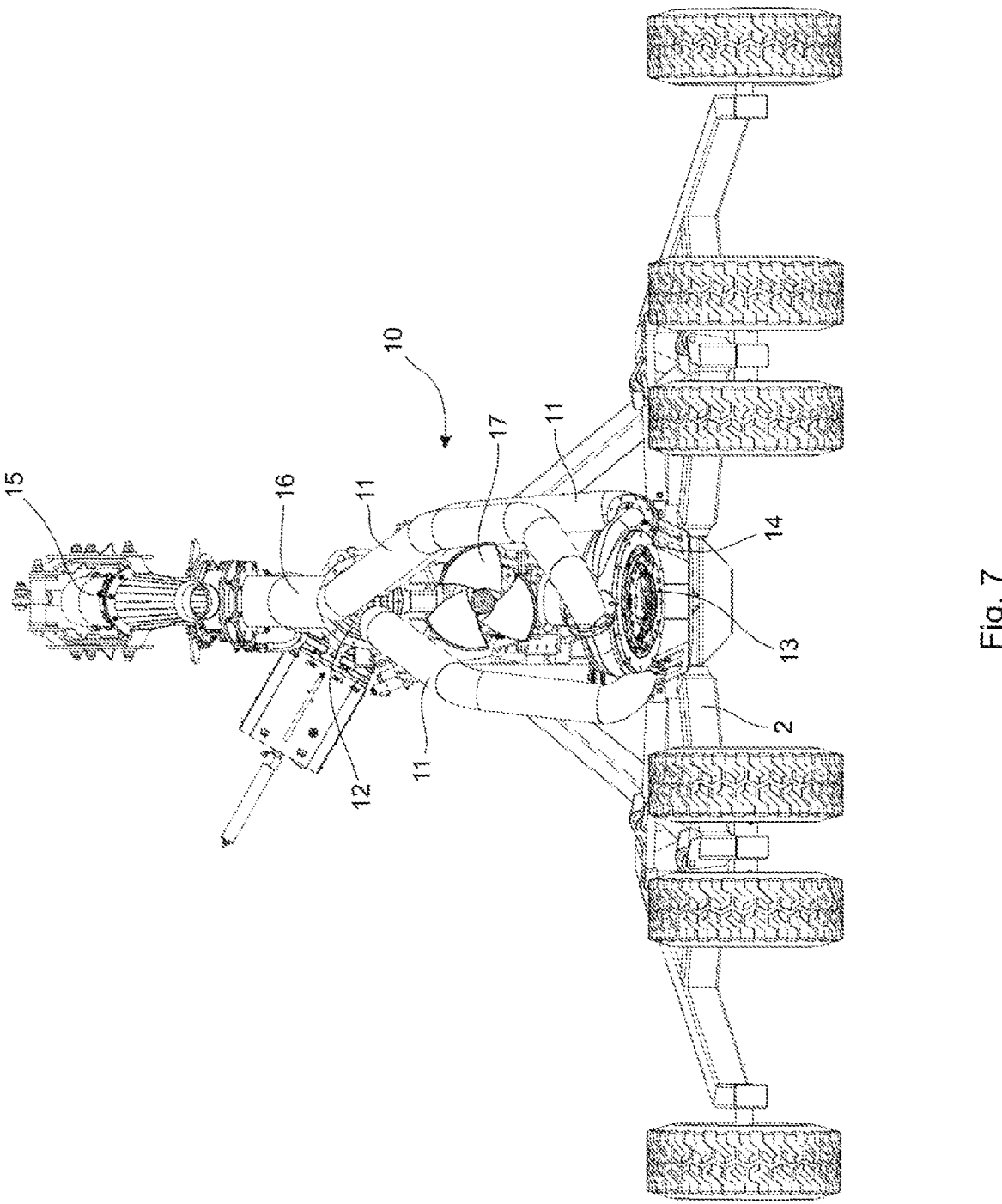
FIG. 7 depicts a rear view of FIG. 2.

FIG. 2 provides a similar view as FIG. 1 except that a high-pressure liquid manure pump 10 of the present invention is mounted on the trailer 2 instead of the standard liquid manure pump. The pump 10 comprises an impeller 13 (not seen in FIG. 2 but labeled in FIG. 7) inside an impeller housing 14 proximate a distal end of the pump 10. The impeller 13 is indirectly driven through a gearset as described below by a main drive shaft 18 and directs liquid manure into three tangentially-oriented outlets in the impeller housing 14 so that the liquid manure flows through three outlet conduits 11 (only one labeled in FIG. 2) into a combiner 12, which combines the three liquid manure flows into a single main liquid conduit 16. The liquid manure is pumped to a proximal end of the main liquid conduit 16 into a tank of a liquid manure spreader (not shown) or another receptacle. The main drive shaft 18 is driven by a power source (e.g., a 200 hp power source), for example a power-take-off (PTO) connected to a combustion engine of an agricultural vehicle or the like or a dedicated engine or motor for operating the main drive shaft 18. The pump 10 also includes an agitator nozzle 15.

The pump 10 differs from the standard pump 1 in providing a gearbox 20 that changes the orientation of the impeller 13, and also provides an additional capability of including the addition of a propeller 17 at a distal end of the main drive shaft 18. It can be seen from the configuration of the pump 10 that the impeller housing 14 is oriented horizontally so that an axis of rotation B-B of the impeller is vertical, i.e., perpendicular with respect to the bottom 5 of the lagoon. Thus, the impeller can be situated much closer to the bottom 5, which permits more complete clearing of the lagoon. Experiments have demonstrated that, when the pump is trailer-mounted and parked on a sloped wall of a liquid manure lagoon, the pump 10 is capable or removing thousands of gallons more of liquid manure from the liquid manure lagoon than the standard pump 1. While the pump 10 is shown mounted on the trailer 2, it is possible to mount the pump on a boom instead of a trailer, where the boom is mounted on a boom vehicle.

Further details and beneficial features of the pump 10 are described below with reference to FIG. 3 to FIG. 9. The gearbox 20 comprises an enclosure 21 through which a power input shaft 25 extends. The power input shaft 25 may be an integral portion of the main drive shaft 18 or, as shown in the Figures, a separate shaft that is drivingly connected at a proximal end 31 thereof to the main drive shaft 18 of the pump 10. The power input shaft 25 has a rotation axis C-C, which is preferably colinear with a rotation axis of the main drive shaft 18.

A first power output shaft 35 extends through a wall of the enclosure. The first power output shaft 35 may be an integral part of an impeller shaft, or as shown in the Figures, a separate shaft that is drivingly connected to an impeller or other device such as a propeller. The first power output shaft 35 has a rotation axis D-D that is the same as the impeller rotation axis B-B when the first power output shaft 35 is an integral part of an impeller shaft or when the first power output shaft 35 is colinear with an additional shaft 36 such as an impeller shaft or a propeller shaft, connected thereto. Connection of the first power output shaft 35 to the additional shaft 36 may be achieved by structures known in the art, or example a female receiver in one end of one of the shafts sized to receive the end of the other shaft. The female receiver may be keyed to end of the other shaft by mated longitudinal grooves and ridges. Preferably, a keyed distal end 37 of the first power output shaft 35 is mated with a keyed female receiver in a proximal end of the additional shaft 36. Longitudinal ridges 38 at the keyed distal end 37 of the first power output shaft 35 are mated with longitudinal grooves in the keyed female receiver of the additional shaft 36.

It is of particular note that the rotation axis D-D (or B-B) forms an acute angle a in a range of 55-75° with the rotation axis C-C of the power input shaft when the rotation axes C-C and D-D are projected into the same plane. The acute angle a is preferably 65-70°, for example about 67.5° or about 70°. It has been found that when the angle between the rotation axes C-C and D-D (or B-B) is within this range, the impeller 13 is ideally oriented to efficiently and effectively pump liquid manure out of the entire liquid manure lagoon when the pump 10 is mounted on the trailer 2 on the sloped wall 3 of the lagoon. In order for the power input shaft 25 to drive the first power output shaft 35, the power input shaft 25 is coupled to the first power output shaft 35 by a first gearset comprising intermeshed bevel gears 26, 27. The bevel gear 26 is disposed around attached to the power input shaft 25. The bevel gear 27 is dispose around and attached to the first power output shaft 35. The bevel angles of the bevel gears 26, 27 are set to permit the gears to intermesh properly when the rotation axis D-D forms the acute a angle in a range of 55-75° with the rotation axis C-C.

In embodiments where the first power output shaft 35 drives the impeller 13 of the pump, the gear ratio between the bevel gear 26 and the bevel gear 27 may be 1:1 or can be set to increase the rotational speed of the first power output shaft 35 relative to the power input shaft 25. By increasing the rotational speed of the first power output shaft 35, the operating pressure of the pump 10 is increased thereby compensating for the extended length of the main liquid conduit 16 required for the pump 10 to reach into the center of the lagoon. In addition, the increased operating pressure permits efficient drag line operations in which reels of hoses are used to convey liquid manure. Preferably, the gear ratio of the bevel gear 26 to the bevel gear 27 is in a range of 1:1 to 1:2, more preferably 1:1.4 to 1:1.8, for example 1:1.66. In one example, the first gearset increases the rotational speed of the first power output shaft 35 to a speed in a range of 1500-1800 rpm (balanced) from a 1000 rpm rotational speed (non-balanced) originating from the power source that drives the main drive shaft 18 (e.g., the PTO of a tractor). The structure of the impeller 13 may also bear on the gear ratio because some impellers require higher speed for efficient pumping than other impellers. Advantageously, the first gearset permits balancing of the shafts 25, 35 so that fewer bearings are required for smooth operation of the pump.

The first power output shaft 35 may have a propeller mounted thereto rather than the impeller, in which case, the apparatus is a propeller agitator rather than a pump. In embodiments where the first power output shaft 35 drives a propeller, the gear ratio between the bevel gear 26 and the bevel gear 27 is preferably set to decrease the rotational speed of the first power output shaft 35 relative to the power input shaft 25. In this embodiment, the gear ratio of the bevel gear 26 to the bevel gear 27 is preferably in a range of 1.2:1, for example 1.1:1 or 1.2:1. In one example, the first gearset decreases the rotational speed of the first power output shaft 35 to a speed of about 888 rpm (balanced) from a 1000 rpm rotational speed (non-balanced) originating from the power source that drives the main drive shaft 18 (e.g., the PTO of a tractor).

A second power output shaft 45 extends through a wall of the enclosure and has a rotation axis E-E that is perpendicular to the rotation axis C-C of the power input shaft 25 when the rotation axes C-C and E-E are projected into the same plane. While the rotation axes C-C and E-E are shown as perpendicular, these axes may instead form a non-perpendicular angle by appropriate design of gearing that couples the second power output shaft 45 to the power input shaft 25. The second power output shaft 45 is connected to a hydraulic pump 50 that circulates lubricating oil through oil lines 51 between the gearbox 20 and an oil cooler 74. To rotationally drive the second power output shaft 45, the power input shaft 25 is coupled to the second power output shaft 45 by a second gearset comprising intermeshed bevel gears 28, 29. The bevel gear 28 is disposed around attached to the power input shaft 25. The bevel gear 29 is dispose around and attached to the second power output shaft 45.

The power input shaft 25 has a distal end 24. In some embodiments, an additional device may be connected to the distal end 24 to be driven by the power input shaft 25, for example the propeller 17. The additional device may be mounted directly on the power input shaft 25, or a third power output shaft 55 may be drivingly connected to the power input shaft 25 with the additional device connected to the third power output shaft 55.

Figure 8:
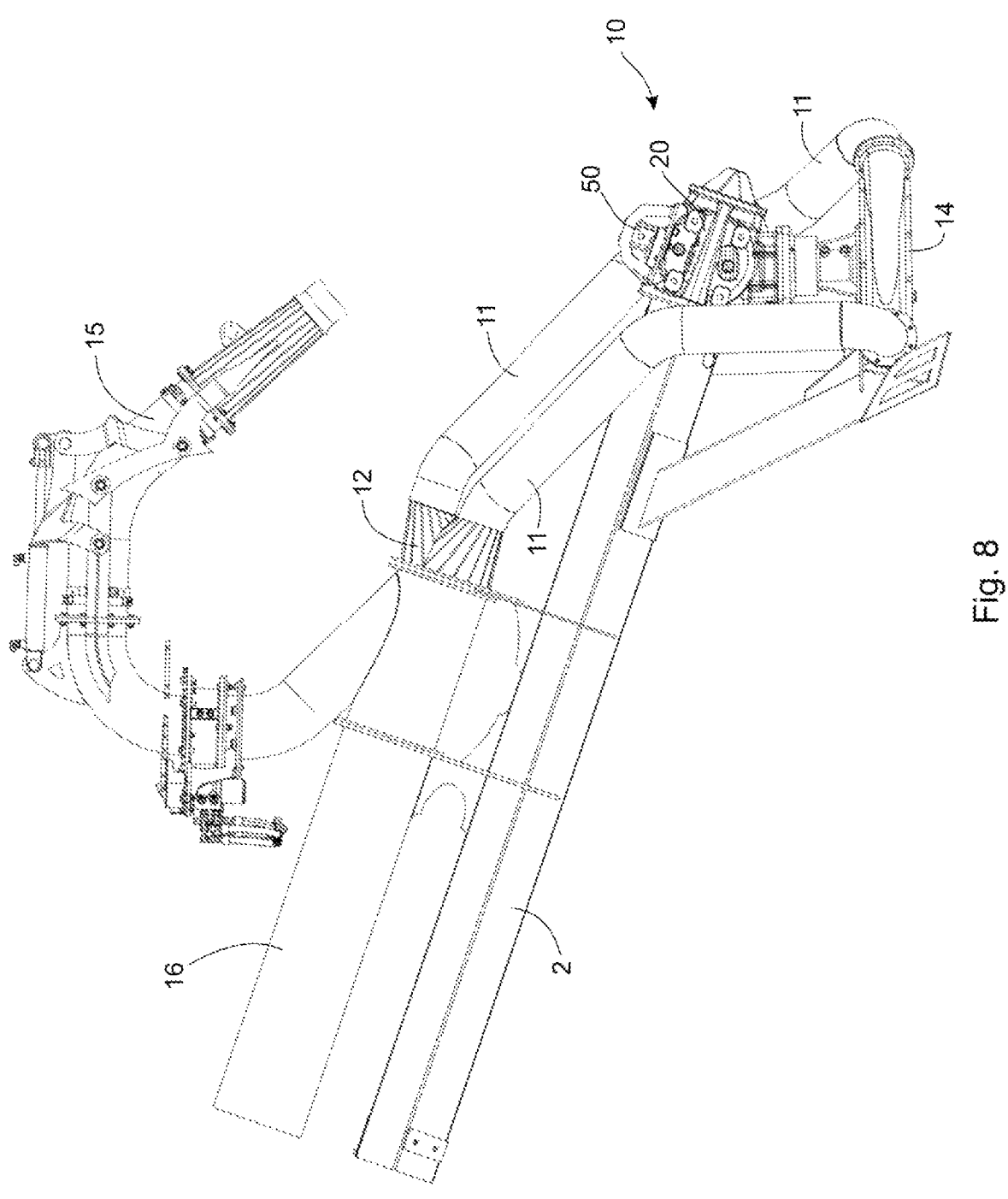
FIG. 8 depicts a variation of the high-pressure liquid manure pump of FIG. 2 without a propeller.

Connection of the power input shaft 25 to the third power output shaft 55 may be achieved by structures known in the art, or example a female receiver in one end of one of the shafts sized to receive the end of the other shaft. The female receiver may be keyed to end of the other shaft by mated longitudinal grooves and ridges. Preferably, the distal end 24 of the first power output shaft 35 is keyed with longitudinal ridges 22 and is mated with corresponding longitudinal grooves in a keyed female receiver in a proximal end of the third power output shaft 55. The third power output shaft 55 is preferably colinear with the power input shaft 25, but may be offset or at a different angle than the power input shaft 25. A third gearset may be used to provide the offset or different angle. Whether or not the third power output shaft 55 is offset or angles with respect to the power input shaft 25, a third gearset may be geared so that the third power output shaft 55, and hence any additional device such as the propeller 27, rotates slower than the power input shaft 25. For example, the third gearset may decrease the rotational speed of the third power output shaft 55 to a speed of about 888 rpm (balanced) from a 1000 rpm rotational speed (non-balanced) originating from the power source that drives the main drive shaft 18 (e.g., the PTO of a tractor). In other embodiments, as shown in FIG. 8, nothing is mounted at the distal end 24 of the power input shaft 25.

The enclosure 21 of the gearbox 20 contains the first and second gearsets as well as portions of the power input shaft 25, the second power output shaft 45 and the first power output shaft 35. The enclosure 21 is filled with hydraulic lubricating oil to lubricate moving parts. Four lip seals 71 are utilized to ensure that to ensure that the lubricating oil is contained within the enclosure. Further the rotating shafts 25, 45 and 35 are rotationally supported on bearings 72 in the enclosure 21 to ensure free rotation of the shafts 25, 45 and 35. The lubricating oil in the enclosure is circulated through the oil cooler 74 via oil lines 51 extending between the oil cooler 74 and the gearbox 20. The oil cooler 74 may be an air-cooled radiator external to the gearbox 20.

To provide modularity and for better serviceability of the pump 10, mechanical bearing units 60, 61 that are removably mounted on the gearbox 20 may be used to support the third power output shaft 55 and the additional shaft 36, respectively, on the gearbox 20. The mechanical bearing units 60, 61 comprise through-bores equipped with bearings 76, mechanical seals 77 and lip seals 78, the respective shafts 55, 36 inserted through and rotationally supported in the through-bores on the bearings 76. The mechanical bearing units 60, 61 contain lubricating oil. The mechanical bearing units 60, 61 comprise mounting flanges 62, 63, respectively, which can be removably secured to corresponding mounting flanges 32, 33, respectively, of the enclosure 21 of the gearbox 20. Removably securing the mechanical bearing units 60, 61 on the enclosure 21 is preferably accomplished using bolts. Use of the mechanical bearing units 60, 61 in this way completely separates the lubricating oil used in the gearbox 20 from the lubricating oil used to lubricate the additional shaft 36 such as an impeller shaft or a propeller shaft from the lubricating oil used in the gearbox 20 to lubricate the gearsets, as well as to completely separate the lubricating oil used to lubricate the third power output shaft 55 from the oil used in the gearbox 20 and the oil used to lubricate the additional shaft 36. Thus, any bearing and/or seal failures in one of the mechanical bearing units 60, 61 does not result in contaminating the lubricating oil in either the gearbox 20 or the other mechanical bearing unit. Because the mechanical bearing units 60, 61 are removable from the gearbox 20 without disturbing the seals 71 in the gearbox 20, failure in one of the mechanical bearing units 60, 61 can be readily and inexpensively rectified in the field by simply exchanging the faulty mechanical bearing unit for a new one.

Also, modularity permitted by the use of the removably mounted mechanical bearing units permits a 'plug-and-play' approach whereby the same gearbox can be used in conjunction with an impeller connected to the first power output shaft for providing a pump, or can be used in conjunction with a propeller connected to the first power output shaft for providing an agitator. Further, the device connected to the distal end of the power input shaft can be readily exchanged. Thus, having the option to independently exchange different devices connected to the first power output shaft and the distal end of the power input shaft permits using the same gearbox for different purposes.

Figure 9:
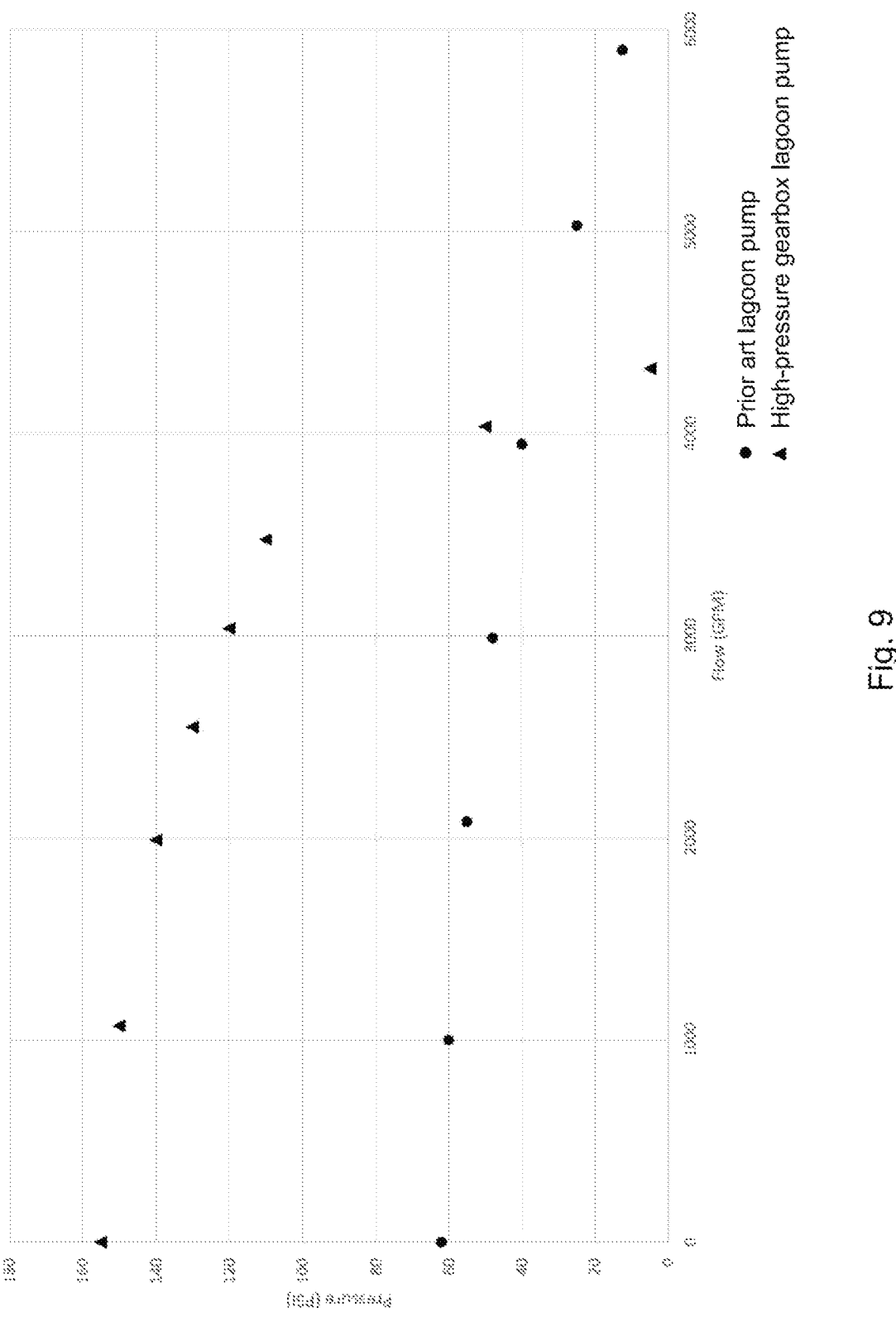
FIG. 9 depicts a graph of pressure (psi) vs. liquid manure flow rate (gpm) illustrating performance difference between the standard liquid manure pump of FIG. 1 (circles) and the high-pressure liquid manure pump of FIG. 2 (triangles).

With reference to FIG. 9, experiments were conducted to compare dead head pressure (psi) of the high-pressure pump 10 of the present invention to the standard pump 1 of the prior art at different flow rates (gpm). As evidenced in FIG. 9, for flow rates up to about 3500 gpm, the pressure in the pump 10 can be maintained at a level at least twice that of the standard pump 1 leading to more effective clearance of the liquid manure lagoon when a longer flow path length of liquid manure is required, for example during drag line operations.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A liquid manure pump comprising:
a pump body having an elongated liquid conduit;
an impeller located proximate a bottom end of the pump body, the impeller having an impeller rotation axis about which the impeller rotates, the impeller having vanes shaped to direct liquid manure into the liquid conduit;
a gearbox containing a gearset;
a power input shaft having a power input shaft rotation axis about which the power input shaft rotates, the power input shaft operatively connectable at a proximal end thereof to a power source, the power input shaft operatively connected to the impeller through the gearset for rotationally driving the impeller; and,
the impeller rotation axis forming an acute angle in a range of 55-75° with the power input shaft rotation axis when the impeller rotation axis and the power input shaft rotation axis are projected into the same plane.

2. The pump of claim 1, wherein the acute angle is in a range of 65-70°.

3. The pump of claim 1, wherein:
the pump comprises a power output shaft directly connected to the gearset so that the power input shaft rotationally drives the power output shaft and directly connected to the impeller so that the power output shaft rotationally drives the impeller; or,
the pump comprises a power output shaft directly connected to the gearset so that the power input shaft rotationally drives the power output shaft, and the impeller comprises an impeller shaft connected to the power output shaft so that the power output shaft rotationally drives the impeller shaft which rotationally drives the impeller.

4. The pump of claim 1, wherein the gearset is geared so that the impeller rotates faster than the power input shaft.

5. A liquid manure pump comprising:
a pump body having an elongated liquid conduit;
an impeller located proximate a bottom end of the pump body, the impeller having an impeller rotation axis about which the impeller rotates, the impeller having vanes shaped to direct liquid manure into the liquid conduit;
a gearbox containing a first gearset and a second gearset;
a power input shaft having a power input shaft rotation axis about which the power input shaft rotates, the power input shaft operatively connectable at a proximal end thereof to a power source;

a first power output shaft having a first power output shaft rotation axis, the first power output shaft operatively connected to the impeller, the first power output shaft operatively connected to the power input shaft through the first gearset for rotationally driving the first power output shaft for rotationally driving the impeller; and, a second power output shaft having a second power output shaft rotation axis about which the second power output shaft rotates, the second power output shaft operatively connected to the power input shaft through the second gearset for rotationally driving the second power output shaft, the impeller rotation axis forming an acute angle in a range of 55-75° with the power input shaft rotation axis when the impeller rotation axis and the power input shaft rotation axis are projected into the same plane.

6. The pump of claim 5, wherein the acute angle is in a range of 65-70°.

7. The pump of claim 5, wherein the first gearset is geared so that the impeller rotates faster than the power input shaft.

8. The pump of claim 5, wherein the second power output shaft rotation axis is perpendicular to the power input shaft rotation axis when the second power output shaft rotation axis and the power input shaft rotation axis are projected into the same plane.

9. The pump of claim 5, further comprising a propeller, wherein:

the power input shaft is operatively connected at a distal end thereof to the propeller for rotationally driving the propeller; or, the power input shaft is operatively connected to a third power output shaft, and the third power output shaft is connected to the propeller for rotationally driving the propeller.

10. The pump of claim 9, wherein the power input shaft is operatively connected to the third power output shaft through a third gearset, and the third gearset is geared so that the propeller rotates slower than the power input shaft.

11. The pump of claim 5, wherein all of the shafts are rotationally supported on respective bearings, the bearings for each shaft are housed in respective bearing units, and each of the bearing units is sealingly isolated from the gearbox so that each of the bearing units can contain a separate reservoir of lubricating oil from the other bearing units and from the gearbox.

12. The pump of claim 5, wherein one or more of the bearing units are removably mounted on the gearbox.

13. The pump of claim 5, wherein the gearbox contains cooling oil that is circulated by a cooling oil pump through an oil cooler.

14. The pump of claim 5, wherein the power source comprises a power-take-off (PTO) connected to a combustion engine.

15. A gearbox comprising:

an enclosure;

a first gearset situated in the enclosure;

a power input shaft having a power input shaft rotation axis about which the power input shaft rotates, the power input shaft operatively connectable at a proximal end thereof to a power source, the power input shaft connected to the first gearset for rotationally driving the first gearset;

a first power output shaft having a first power output shaft rotation axis about which the first power output shaft rotates, the first power output shaft directly connected to the first gearset to be rotationally driven by the first gearset when the first gearset is driven by the power input shaft;

a second gearset situated in the enclosure; and, a second power output shaft having a second power output shaft rotation axis about which the second power output shaft rotates, the first power output shaft rotation axis forming an acute angle in a range of 55-75° with the power input shaft rotation axis when the first power output shaft rotation axis and the first power input rotation axis are projected into the same plane.

16. The gearbox of claim 15, wherein the acute angle is in a range of 65-70°.

17. The gearbox of claim 15, wherein the second power output shaft rotation axis is perpendicular to the power input shaft rotation axis when the second power output shaft rotation axis and the first power input rotation axis are projected into the same plane.

18. The gearbox of claim 15, wherein the first gearset is geared so that the first power output shaft rotates slower than the power input shaft.

19. The gearbox of claim 15, wherein a propeller is mounted on the first power output shaft.

* * * * *